(12) United States Patent
Vis et al.

(10) Patent No.: US 6,415,902 B1
(45) Date of Patent: Jul. 9, 2002

(54) ORIENTATION MECHANISM

(75) Inventors: Andreas Gerardus Vis, Zoetermeer; Johannes Valk, Nieuwerkerk a/d lJssel; Leendert Ploeg, Maassluis, all of (NL)

(73) Assignee: Nederlande Organisatie voor toegepast-natuurwetenschappelijk Onderzoek TNO (NL)

( * ) Notice: Subject to any disclaimer, the term of this patent is extended or adjusted under 35 U.S.C. 154(b) by 0 days.

(21) Appl. No.: 09/647,702

(22) PCT Filed: Apr. 8, 1999

(86) PCT No.: PCT/NL99/00210
§ 371 (c)(1),
(2), (4) Date: Apr. 9, 2001

(87) PCT Pub. No.: WO99/52383
PCT Pub. Date: Oct. 21, 1999

(30) Foreign Application Priority Data

Apr. 8, 1998 (NL) .............................................. 1008841

(51) Int. Cl.[7] .............................................. B65G 47/24
(52) U.S. Cl. ...................................... 198/384; 198/387
(58) Field of Search ................................ 198/385, 387, 198/384, 382

(56) References Cited

U.S. PATENT DOCUMENTS

| | | | | |
|---|---|---|---|---|
| 2,843,251 A | * | 7/1958 | Hoffman, Jr. et al. ...... | 198/385 |
| 4,457,434 A | * | 7/1984 | Brown et al. ................ | 209/539 |
| 4,730,719 A | * | 3/1988 | Brown et al. ................ | 198/387 |
| 4,872,564 A | * | 10/1989 | Van Der Schoot .......... | 209/511 |
| 4,981,205 A | * | 1/1991 | Cowlin ........................ | 198/387 |
| 5,176,243 A | * | 1/1993 | Temming et al. ........... | 198/400 |
| 6,148,989 A | * | 11/2000 | Ecker .......................... | 198/387 |
| 6,179,129 B1 | * | 1/2001 | Powel, Jr. ................... | 209/912 |

FOREIGN PATENT DOCUMENTS

NL 9301363 8/1993

* cited by examiner

Primary Examiner—Christopher P. Ellis
Assistant Examiner—Khoi H. Tran
(74) Attorney, Agent, or Firm—Norris, McLaughlin & Marcus P.A.

(57) ABSTRACT

The present invention is directed to an orientation mechanism for orienting objects having a bigger convex portion and a smaller projecting portion, such as mushrooms, pears, onions, flower bulbs and the like. The mechanism is provided with an endless conveying member having a plurality of hourglass-shaped rollers arranged transversely of the conveying direction. The rollers are rotatable and spaced apart a specific distance from one another. Tilting belts and upright elements are also located parallel to the conveying member such that the convex portion of the convex portion of the objects to be oriented will be prevented from coming between the rollers. Separate rope carriers are presented parallel to the conveying member for supporting the objects.

16 Claims, 3 Drawing Sheets

ORIENTATION MECHANISM

BACKGROUND OF THE INVENTION

The present invention relates to an orientation mechanism for orienting objects whose surface comprises at least a bigger convex portion and at least a smaller projecting or bulging portion, such as mushrooms, pears, onions, flower bulbs and the like, provided with an endless conveyer member, comprising a number of conveying elements formed by drivable hourglass-shaped rollers, which are located adjacent each other and arranged transversely to the conveying direction, the rollers being spaced apart a specific distance one behind the other, such that the convex portion of objects to be oriented will be prevented from coming between the rollers.

Such mechanisme is known from EP-A-0518-209. In this document an apparatus is described for conveying and orienting fruits and for removing oriented fruits by means of a rotating pneumatic fruit engaging device. Particularly for mushrooms which must be subjected to further treatment, e.g. cutting the end part of the stipes of the mushrooms, such an apparatus is not appropriate.

A mechanisms for handling mushrooms is known from Dutch laid-open application 93.01363, relating to an apparatus for conveying harvested mushrooms to a cutting device. The endless conveying member known from this publication comprises a number of conveyor belts juxtaposed in the conveying direction and driven at different peripheral velocities, the arrangement being such that the mushrooms located thereon are oriented with either their caps, or their feet in leading position, so that they are presented to the cutting device in a predetermined position. This known apparatus has the drawback that the orientation of the mushrooms is not unequivocal, while, moreover, relatively heavy mushrooms standing with their caps on the conveying member are inclined to have their positions unchanged and, possibly, to rotate about their own longitudinal axes.

Such orientation problems do not merely occur in respect of mushrooms, but also in respect of all kinds of objects that are presented in a random position and which, for a further treatment or processing, should be oriented in a specific manner. In this connection, one should not only think of other natural products, such as onions, flower bulbs, pears and the like, but also of, for instance, wooden products or plastic products that can serve as decoration or toy, such as toadstools which, brought into a specific orientation, have to be automatically provided with various colors.

SUMMARY OF THE INVENTION

Hence, it is the object of the invention to avoid the above orientation problems entirely or at least to a considerable extent, and to provide an orientation mechanism by means of which all kinds of objects and in particular objects whose surface comprises at least a convex portion and at least a projecting or bulging portion, can be oriented unequivocally so that they can readily be further treated or processed.

To that end, in accordance with the invention, the orientation mechanism as described in the preamble is characterized in that the conveying elements are formed by rollers arranged transversely to the conveying direction and spaced apart a specific distance one behind the other, which rollers are movable in the conveying direction and are suitable for orienting objects, while further, separate carriers are present suitable for supporting oriented objects.

To provide a proper view of various preferred embodiments, it will, for the sake of simplicity, hereinafter be assumed that the objects are formed by mushrooms, of which the convex portion of the surface is formed by the caps and the projecting or bulging portion is formed by the stipes of the mushrooms. However, it is pointed out that all types of other objects are also suitable for being oriented by the mechanism in its various embodiments.

The rollers can be formed by rolls. Due to their rolling behavior, the mushrooms are rotated by the rolls until they end up with their stipes between the rolls, or come to lie on the rolls with their stipes directed forwards or rearwards; thus, the mushrooms have oriented themselves. However, if the stipe happens to be relatively long or curved at the end, a mushroom might not get across a roll and, consequently, does not orient itself. It also occurs that the mushrooms, rotating about their longitudinal axis, start moving along this axis; in that case, the position of the oriented mushrooms along the rolls is not completely defined. Hence, it is preferred that the rollers be of hourglass-shaped design. In particular, the hourglass-shaped rollers are manufactured from a synthetic material, such as rubber of PVC, and preferably, during their functioning, they are held in a dry or moist condition, depending on the surface of the objects to be oriented.

In contrast with the above-cited Dutch laid-open application, the carriers fitted in accordance with the invention, suitable for supporting the oriented mushrooms, are preferably of such design that the mushrooms are ultimately supported in vertical orientation; for this purpose, the carriers are in particular formed by ropes, belts or similar elements that are movable in the conveying direction. Hereinafter, for the sake of simplicity, reference will in each case be made to 'ropes', while it should be taken into account that whatever applies to ropes, also applies to 'belts or similar elements'. The ropes may be arranged within the range of the rollers for movement along with the rollers in the conveying direction. The effect thus achieved is that once the mushrooms are vertically oriented and, accordingly, further advanced while suspending between the ropes, they will remain in this position. In that case, it has in principle become impossible for them to roll any further. Preferably, downstream of the conveying member formed by the rollers, the ropes extend further over any desired distance. To ensure that during orienting, the mushrooms are not obstructed herein, the rollers are provided, at a particular distance from their two side faces, with circular slots or grooves through which the ropes run. This enables the ropes to be provided at a shorter distance from the horizontal plane through the center line of the rollers.

The ropes need not necessarily be provided for movement along with the rollers within the entire range of the rollers. A construction where the ropes connect to the rollers of the conveying member at the end face thereof could suffice. This means that the mushrooms on the conveying member can be oriented with their stipes in forward, rearward or vertical position, and are subsequently taken over in the vertical position by the ropes connecting to the conveying member. Instead of ropes connecting to the conveying member, for instance fork-shaped grippers accommodated in an endless chain track may also be employed. Such a solution, however, will be much more complex than the above-mentioned rope constructions.

Although a construction of the rollers in the form of hour-glasses is an improvement over a construction wherein the rollers are designed as rolls, the use of hourglass-shaped rollers may also involve non-orientation of the mushrooms. When the mushrooms come to rest with their caps in the deepest portion of the hourglass-shaped rollers and have their stipes pointing towards the lateral side, the stipes will laterally project from the conveying member if these stipes are longer than approximately half the length of the hourglass-shaped rollers. To enable orienting the mushrooms as yet in the desired manner in such a situation, in accordance with the invention, tilting members are provided on either side of the rollers in the conveying direction, which tilting members are suitable for orienting as yet objects not oriented by the rollers. In particular, these tilting members are formed by tilting belts having upright elements attached thereto. Although it is possible that the relative velocity of the tilting belts with respect to the forward velocity of the rollers is chosen to be less than or equal to the forward velocity of the rollers, it has proved to be favorable when the velocity of the tilting belts is greater than the forward velocity of the rollers. The effect thus achieved is that due to the upright elements, the stipes of the mushrooms that laterally project from the rollers are given a forwardly directed impulse in the rotational direction of the rollers and in the conveying direction, as a result of which the mushrooms can be moved into a position in which they ultimately adopt a vertical orientation.

To enable speeding up the treatment or processing of the objects, the velocity of the conveying member could be increased. However, this entails the drawback that the orientation of the objects may become rather restless. Hence, it is better to design the conveying member with several juxtaposed rows of conveying elements having carriers and rollers. Accordingly, in practice, instead of such so-called one-track machines, multi-track machines will be used.

Further, it is observed that in a favorable embodiment, the conveying member is of endless design, while the rollers that are movable in the conveying direction on the upper side have their lower side contacting a flat surface and are rotated through friction with said surface.

The invention does not only relate to an orientation mechanism, but also to an apparatus for processing objects, in particular objects whose surface comprises at least a convex portion and at least a projecting or bulging portion, such as mushrooms, pears, onions, flower bulbs and the like, provided with a supply member for these objects, a sorting member for selecting the objects according to size, and a processing member for the further processing of the objects. The invention is characterized in that between the sorting member and the processing member, an orientation mechanism of the above-indicated type is provided. A sorting member for selecting objects according to size is necessary when objects of varying sizes are treated or processed; after all, as far as its construction is concerned, the orientation mechanism according to the invention is entirely adapted to orienting objects of equal or approximately equal size, as is particularly the case in the processing of mushrooms.

Because a given percentage of the mushrooms cultured in the usual manner on beds and harvested mechanically or manually exhibits a so-called sandy base, while, further, customers increasingly impose requirements with regard to the length of the stipes in relation to the volume of the cap, it is desired that the stipes that are too long and/or have a sandy base can be cut off. For this, many cutting devices have been developed. For a number thereof, it is important that the mushrooms be oriented.

Hence, the invention further relates to an automatic mushroom processing apparatus characterized in that the mushrooms, selected according to size and oriented with their stipes downwards by means of an orientation mechanism of the above-indicated type, are supplied to an inspection and cutting member for signaling mushrooms with sandy bases or mushrooms whose stipes are too long, and for cutting off a part of the stipe.

BRIEF DESCRIPTION OF THE DRAWINGS

The invention will presently be specified with reference to the accompanying drawings. In these drawings.

DESCRIPTION OF THE PREFERRED EMBODIMENT

Figure 1:
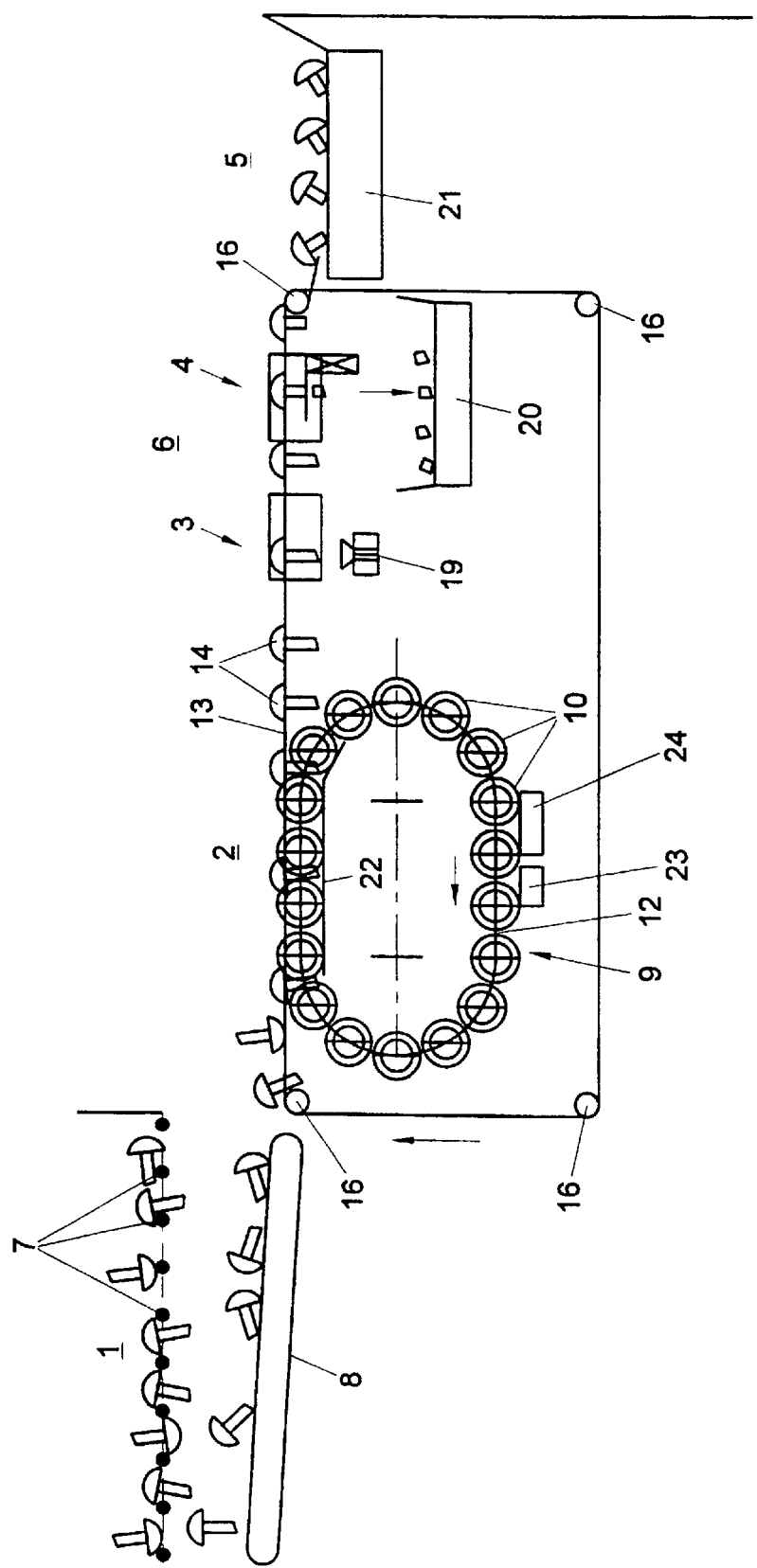
FIG. 1 shows a schematic arrangement of an automatic mushroom processing apparatus according to the invention.
Figure 4:
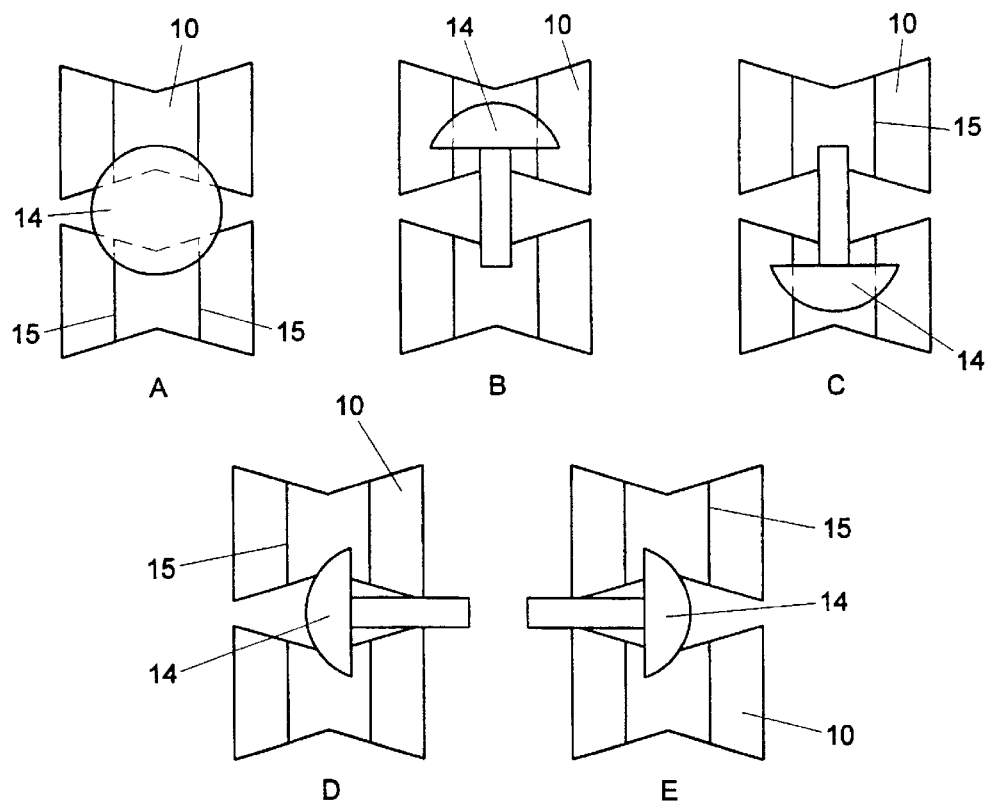
FIGS. 4A–4E show a number of oriented positions of a mushroom on the hourglass-shaped rollers of the orientation mechanism.

The apparatus shown schematically in FIG. 1 comprises a supplying member (not shown), a sorting member 1, an orientation mechanism 2, an inspection member 3, a cutting member 4 and a discharging member 5. The inspection member and the cutting member constitute a mushroom processing member 6.

The sorting member 1 is suitable for selecting mushrooms according to size. All sorts of known and suitable sorting members can be used herefor. For instance, use can be made of the principle of mutually diverging ropes located in a horizontal plane, in FIG. 1 perpendicular to the plane of the drawing; in FIG. 1, these ropes are designated by reference numeral 7. The mushrooms are moved onto the ropes and depending on the interspace between the ropes and the size of the mushrooms, these mushrooms will at a particular place fall between the ropes and end up on a conveyor 8. In a practical arrangement, such orientation mechanism is present for various size categories of mushrooms. Also, in the case of a substantial supply of mushrooms having more or less the same size, several orientation mechanisms may be present. In principle, all these orientation mechanisms, adjusted or not adjusted to the same mushroom size, are arranged in mutually parallel relationship, parallel to the plane of the drawing. However, the present description will be limited to a so-called one-track machine, i.e. a machine having a single orientation mechanism. It will, however, be understood that in practice, multi-track machines will be employed.

The heart of the orientation mechanism is formed by a circulating, endless conveying member 9. This conveying member 9 is substantially built up from conveying elements formed by hourglass-shaped rollers 10 that are connected in parallel one behind the other and that are spaced apart so that the space centrally between two adjacent rollers is on the one hand sufficiently large for the stipes of mushrooms to fit therebetween, and on the other sufficiently narrow to prevent the caps of the mushrooms from fitting therebetween as well and hence to prevent the mushrooms from falling between the rollers. The rollers 10 have their shaft-shaped ends 11 accommodated in circular chains or toothed belts 12. The upper rollers, traveling forwards in conveying direction, are wholly or partially supported by a fixedly arranged flat surface 22 formed by, for instance, a plate-shaped body or by strip-shaped bodies. By driving the entire train of rollers by a motor, the upper rollers 10 contacting this flat surface 22 are rotated individually through friction with this surface. However, it is also possible to use a motor-driven belt instead of this fixedly arranged surface 22, so that the rollers are rotated by moving this driven belt along them, in contact therewith.

The hourglass-shaped rollers are manufactured from a synthetic material, such as rubber or PVC, and can, when the apparatus is in operation and this is desired, be held in a wet state by means of, for instance, a spraying apparatus 23 which may be arranged on the lower side of the conveying member 9. Next to this spraying apparatus 23 on the lower side of the conveying member 9, there may also be arranged a cleaning member 24 for the rollers.

Figure 2:
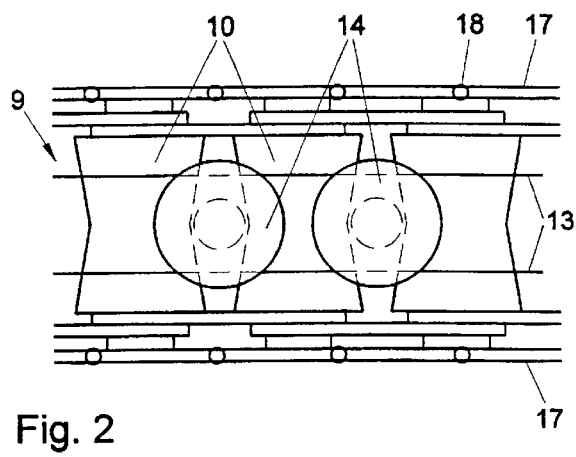
FIG. 2 is a top plan view of a part of the orientation mechanism present therein.
Figure 3:
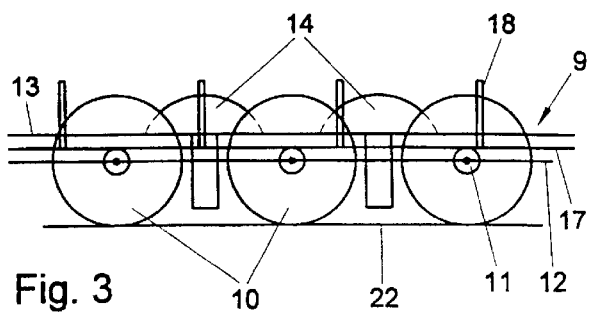
FIG. 3 is a side elevation of a part of this orientation mechanism.
Figure 6:
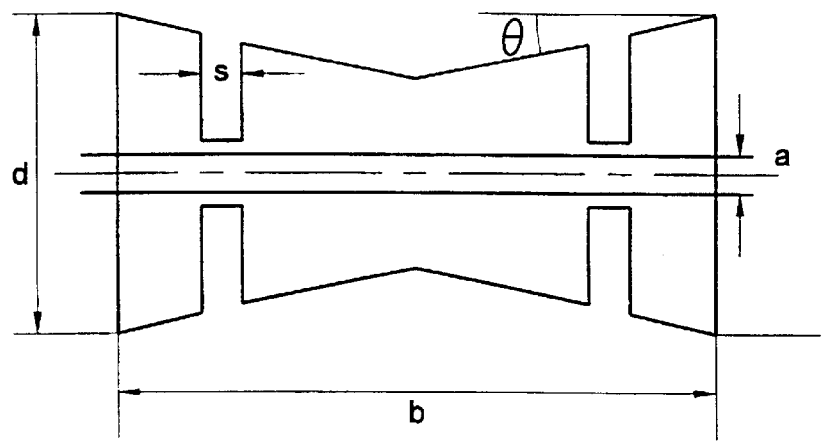
FIG. 6 shows a longitudinal section of an hourglass-shaped roller.

The orientation mechanism 2 further comprises mushroom carriers in the form of two mutually parallel ropes 13. The interspace between these ropes is such that the mushrooms are carried on two sides while suspending from their caps and with their stipes falling between the ropes, as is clearly demonstrated in FIGS. 2 and 3, where the mushrooms are designated by reference numeral 14. At a particular distance from their two side faces, the hourglass-shaped rollers 10 are provided with circular slots or grooves 15. Through these slots or grooves 15, the ropes 13 extend. The depth of these grooves is such that the mushrooms, during the orientation thereof, are not obstructed by the ropes. For this purpose, the shaft of the hourglass-shaped rollers 10 will have a relatively small diameter; indeed, this precisely allows the slots or grooves to be provided at such a depth that said obstruction of the orientation of the mushrooms is avoided. In this connection, reference be made to a dimensioning of the hourglass-shaped rollers that has proved to be favorable in practice, as indicated in FIG. 6. At their lateral surfaces, the hourglass-shaped rollers have a diameter d of from 75 to 130 mm, a length b of from 75 to 100 mm, a shaft diameter a of from 6 to 15 mm, a width of the slots or grooves of from 5 to 15 mm, while the surface of the hourglass-shaped roller extends at an angle θ of from 15 to 30°. Extending in the slots or grooves are round ropes having a diameter of from 4 to 12 mm. This dimensioning is adjusted to mushrooms having a cap diameter to the order of magnitude of from 60 to 75 mm. It will be understood that for other mushroom sizes, differently dimensioned hourglass-shaped rollers will be employed.

Figure 7:
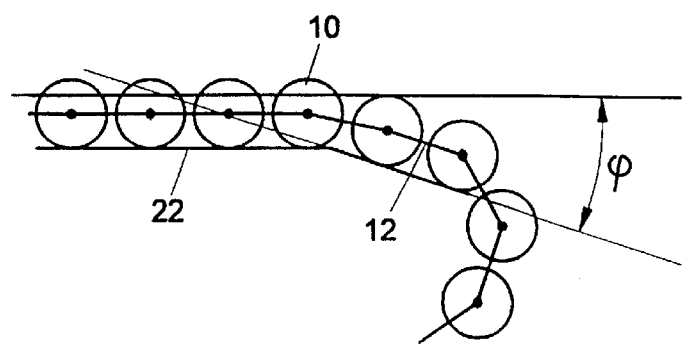
FIG. 7 schematically shows a part of the conveying member of the orientation mechanism; while FIG. 8 schematically shows a part of an alternative to the orientation mechanism according to the invention.

The ropes 13 do not only extend within the range of the rollers 10, but in the embodiment shown in FIG. 1 also constitute the carriers of the mushrooms outside this range. As indicated in FIG. 1, the ropes constitute the carriers of mushrooms that have not yet been oriented, coming from the conveyor 8 before the ropes engage the rollers 10 of the conveying member 9. Likewise, they constitute the carriers of the oriented mushrooms after the ropes are released from the grooves 15 in the rollers 10. In practice, this release proves to proceed particularly efficiently when the angle ψ at which the rollers run away from the ropes is in the order of from 10 to 40°, in particular about 20°, see FIG. 7.

It will be understood that, different from this specific embodiment, it is also possible to transfer the mushrooms directly from the conveyor 8 onto the rollers 10.

In the embodiment shown, the ropes 13 also constitute the mushroom carriers in the inspection and cutting members 3 and 4 respectively. To this end, the ropes 13 are provided for motor drive over the rollers 16 upstream of the inlet side of the orientation mechanism 2 and downstream of the cutting member 4. The ropes 13 are driven in the conveying direction at a velocity greater than or equal to the velocity of the train of rollers; preferably, however, the rope velocity is slightly greater than that of the train of rollers in the conveying direction. In relation to the peripheral velocity of the rollers, the rope velocity is selected so that the rolling motion of the rollers during travel of the rollers and ropes in the conveying direction provides a stable orientation of the mushrooms, while the number of mushrooms to be oriented per unit of time is yet sufficiently large.

Figure 5:
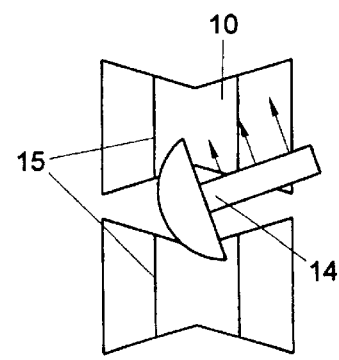
FIG. 5 shows a mushroom to be oriented on said hourglass-shaped rollers.

The mushrooms taken over from the conveyor 8 are received on the ropes 13 and when the ropes come within the range of the rollers, they will, due to their specific shape and rolling behavior, be rotated on the rollers 10 so that they adopt specific preferred positions. These preferred positions are indicated in FIGS. 4A through 4E. In the positions indicated in FIGS. 4A, 4B and 4C, the mushrooms are oriented in a desired manner. Problems occur when the mushrooms assume the positions indicated in FIGS. 4D and 4E. Because of the rotational movement of the rollers, the mushrooms will then start rotating about their own longitudinal axes and remain in this undesired position. When the mushrooms end up on the rollers in a random position, they will adopt one of said preferred positions, due to the rolling movement of the rollers 10 and their own rolling behavior. If a mushroom falls onto the rollers in the position indicated in FIG. 5, the force acting on the stipe of the mushroom (indicated by arrows in FIG. 5), brought about by the rolling movement of the hourglass-shaped rollers 10, will cause the mushroom to end up in one of the preferred positions indicated in FIGS. 4A, 4B and 4C. This will depend on the length of the stipe and the friction between the mushroom and the hourglass-shaped rollers. In the positions shown in FIGS. 4D and 4E, the stipe of the mushroom projects. This projection provides the possibility of causing an additional force to act on the mushroom. This force is exerted by tilting members especially arranged for that purpose, in the form of tilting belts 17 and upright elements 18 mounted thereon, which upright elements have such a length that they project above the hourglass-shaped rollers. By providing the tilting members on either side of the roller train and, moreover, moving them at a velocity greater than that of the roller train, the effect achieved is that the upright elements 18 come into contact with the projection mushroom stipes and give them such a push in the direction of travel and the rotational direction of the rollers, that they will commonly end up in one of the preferred positions of FIGS. 4A, 4B or 4C. Preferably, the distance between the upright elements is selected so that it approximately corresponds to the distance between the shafts of the rollers 10.

FIG. 1 indicates how the mushrooms, vertically oriented and resting on the ropes 13, are fed to the inspection member 3. By means of a detector 19 provided therein, it is determined whether the stipes of the mushrooms are too long and/or have a sandy base. If this should be the case, a part of the stipe is cut off in the cutting member 4. The cut-off stipe parts are collected on a conveyor or in a tray 20, while the mushrooms whose stipe appearance and length meet the set requirements are taken over by a discharging member 5 formed by a conveyor belt 21 perpendicular to the plane of the drawing.

Figure 8:
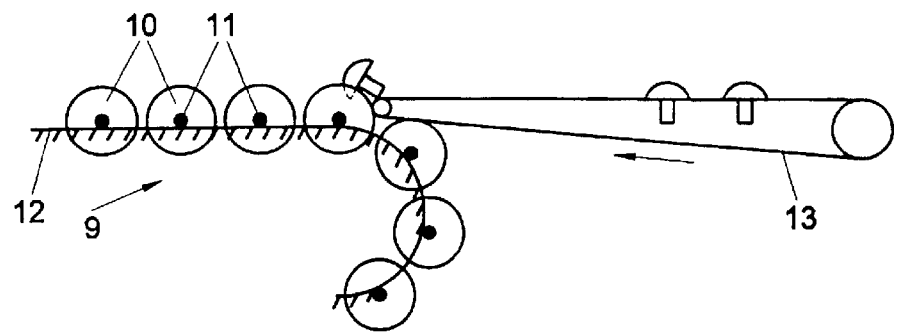

FIG. 8 shows an alternative to the orientation mechanism wherein the ropes 13 do not extend to a position within the range of the hourglass-shaped rollers, but connect to the end face of the roller train. Here, the oriented mushrooms in the orientation mechanism rest on the rollers. Accordingly, at the end of the conveying member, they are taken over by the ropes 13, while assuming the vertical position, i.e. if they have not done so already.

The invention is not limited to the embodiment shown here, which is specifically adapted to the processing of mushrooms. The underlying inventive concept may also be applied to other natural products, such as onions, pears, flower bulbs or all sorts of synthetically manufactured products, as long as these products have a specific shape, i.e. a shape that is eligible for orientation. These may also be elongated objects, such as carrots, heads of chicory, and the like. The surface of the products must be such that they can undergo a rotational movement on the rollers 10, in such a manner that they are oriented in a preferred direction.

What is claimed is:

1. An orientation mechanism for orienting objects whose surface comprises at least a bigger convex portion and at least a smaller projecting or bulging portion, provided with an endless conveyer member, comprising a number of conveying elements formed by drivable hourglass-shaped rollers, which are located adjacent each other and arranged transversely to the conveying direction, the rollers being spaced apart a specific distance one behind the other, such that the convex portion of objects to be oriented will be prevented from coming between the rollers, wherein the rollers are drivable such that a carrying surface thereof is movable in the conveying direction, while further, separate carriers are present suitable for supporting oriented objects, which carriers at least extend and are movable in the conveying direction.

2. An orientation mechanism according to claim 1, wherein the carriers are designed so that the objects supported thereby can be oriented with their bulging or projection portion forwards, rearwards or vertically downwards.

3. An orientation mechanism according to claim 1, wherein the carriers are formed by ropes, belts or the like.

4. An orientation mechanism according to claim 3, wherein the ropes, belts or the like are arranged for movement within the range of the rollers, in the conveying direction of the rollers.

5. An orientation mechanism according to claim 4, wherein the rollers are provided, at a particular distance from their two side faces, with circular slots or grooves through which the ropes, belts or the like extend.

6. An orientation mechanism according to claim 3, wherein the ropes, belts or the like connect at the end face of the conveying member to the rollers thereof.

7. An orientation mechanism according to claim 1, wherein two ropes, belts or the like are present, wherebetween the oriented objects can be further conveyed in suspended condition.

8. An orientation mechanism according to claim 1, wherein on either side of the rollers, in the conveying direction, tilting members are provided, suitable for orienting objects that have not been oriented in one direction by the rollers, as yet in said direction.

9. An orientation mechanism according to claim 8, wherein the tilting members are formed by tilting belts and upright elements attached thereto, said tilting belts being driven at a velocity greater than the forward velocity of the rollers and ropes, belts or the like.

10. An orientation mechanism according to claim 1, wherein the conveying member comprises several juxtaposed rows of conveying elements having rollers and carriers.

11. An orientation mechanism according to claim 1, wherein the conveying member is of endless design, while the rollers movable in the conveying direction on the upper side have their lower side contacting a flat surface and are driven through friction with said surface.

12. An orientation mechanism according to claim 1, wherein a cleaning member for cleaning the rollers is present.

13. An orientation mechanism according to claim 1, wherein a spraying member is present for causing the transport of the objects on the rollers to take place in wet condition.

14. An apparatus for processing objects, in particular objects whose surface comprises at least a convex portion and at least a projecting or bulging portion, such as mushrooms, pears, onions, flower bulbs and the like, provided with a supplying member for said objects, a sorting member for selecting the objects according to size, and a processing member for the further processing of the objects, wherein between the sorting member and the processing member, an orientation mechanism according to claim 1 is provided.

15. An automatic mushroom processing apparatus, wherein the mushrooms, selected according to size and orientated with their stipes downwards by means of a mechanism according to claim 1, are fed to an inspection and cutting member for signaling mushrooms with sandy bases of mushrooms having stipes that are too long, and for cutting off a part of the stipe.

16. An orientation mechanism for orienting objects per claim 1, wherein the object having at least a bigger convex portion and at least a smaller projecting or bulging portion is selected from the group consisting of mushrooms, pears, onions, or flower bulbs.

* * * * *